US010417518B2

(12) United States Patent
Hunt et al.

(10) Patent No.: US 10,417,518 B2
(45) Date of Patent: Sep. 17, 2019

(54) VEHICLE CAMERA SYSTEM

(71) Applicant: DENSO International America, Inc., Southfield, MI (US)

(72) Inventors: Shawn Hunt, Pinckney, MI (US); Joseph Lull, South Haven, MI (US)

(73) Assignee: DENSO International America, Inc., Southfield, MI (US)

( * ) Notice: Subject to any disclaimer, the term of this patent is extended or adjusted under 35 U.S.C. 154(b) by 51 days.

(21) Appl. No.: 15/455,935

(22) Filed: Mar. 10, 2017

(65) Prior Publication Data

US 2018/0262678 A1 Sep. 13, 2018

(51) Int. Cl.
| H04N 5/232 | (2006.01) |
| H04N 7/18 | (2006.01) |
| G06K 9/62 | (2006.01) |
| G06K 9/00 | (2006.01) |
| G06K 9/46 | (2006.01) |
| H04N 9/64 | (2006.01) |
| G06T 5/00 | (2006.01) |
| H04N 5/235 | (2006.01) |
| H04N 5/243 | (2006.01) |
| G06K 9/20 | (2006.01) |

(52) U.S. Cl.
CPC .......... *G06K 9/46* (2013.01); *G06K 9/00791* (2013.01); *G06K 9/2027* (2013.01); *H04N 5/2352* (2013.01); *H04N 5/23229* (2013.01); *H04N 5/243* (2013.01); *H04N 7/183* (2013.01); *H04N 9/64* (2013.01)

(58) Field of Classification Search
CPC ...... H04N 5/23216; H04N 7/183; H04N 9/64; H04N 5/23229; H04N 5/2352; H04N 5/243; G06K 9/00798; G06K 9/46; G06K 9/6202; G06K 9/628; G06K 9/00791; G06K 9/2027; G06T 5/002; G06T 2207/10004; G06T 2207/10024; G06T 2207/30256
USPC ....................................................... 348/148
See application file for complete search history.

(56) References Cited

U.S. PATENT DOCUMENTS

| 9,121,717 B1* | 9/2015 | Zhu ........................ B60W 30/16 |
| 2007/0297753 A1 | 12/2007 | Usui et al. |
| 2010/0048242 A1* | 2/2010 | Rhoads ............. G06F 17/30244 |
| | | 455/556.1 |
| 2010/0207958 A1* | 8/2010 | Kimura .................. H04N 5/332 |
| | | 345/596 |
| 2014/0022408 A1 | 1/2014 | Nashizawa |
| 2014/0232895 A1 | 8/2014 | Schieltz |
| 2015/0282766 A1* | 10/2015 | Cole ..................... A61B 5/7267 |
| | | 702/139 |

* cited by examiner

*Primary Examiner* — Matthew K Kwan
(74) *Attorney, Agent, or Firm* — Harness, Dickey & Pierce, P.L.C.

(57) ABSTRACT

A camera system for a vehicle. The system includes a camera configured to capture an image of an area about the vehicle, and a control module. The control module compares the captured image to a plurality of previously captured training images. The control module also determines which one of the plurality of training images is most similar to the captured image. Furthermore, the control module modifies settings of the camera to match camera settings used to capture the one or more of the plurality of training images that is most similar to the captured image.

17 Claims, 3 Drawing Sheets

US 10,417,518 B2

VEHICLE CAMERA SYSTEM

FIELD

The present disclosure relates to a vehicle camera system.

BACKGROUND

This section provides background information related to the present disclosure, which is not necessarily prior art.

More and more vehicles are being outfitted with cameras to detect lane markers, obstacles, signage, infrastructure, other vehicles, pedestrians, etc. The cameras can be used, for example, to enhance safe vehicle operation and/or to guide the vehicle during autonomous driving. While current cameras are suitable for their intended use, they are subject to improvement. Although there are various image processing technologies applied in imaging, no single technique or combination of techniques addresses the robustness issues experienced with automotive applications.

The present teachings provide for camera systems and methods that advantageously enhance the object detection capabilities of vehicle cameras, for example. One skilled in the art will appreciate that the present teachings provide numerous additional advantages and unexpected results in addition to those set forth herein.

SUMMARY

This section provides a general summary of the disclosure, and is not a comprehensive disclosure of its full scope or all of its features.

The present teachings include a camera system for a vehicle. The system includes a camera configured to capture an image of an area about the vehicle, and a control module. The control module compares the captured image to a plurality of previously captured training images. The control module also determines which one of the plurality of training images is most similar to the captured image. The control module then modifies settings of the camera to match camera settings used to capture the one or more of the plurality of training images that is most similar to the captured image.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
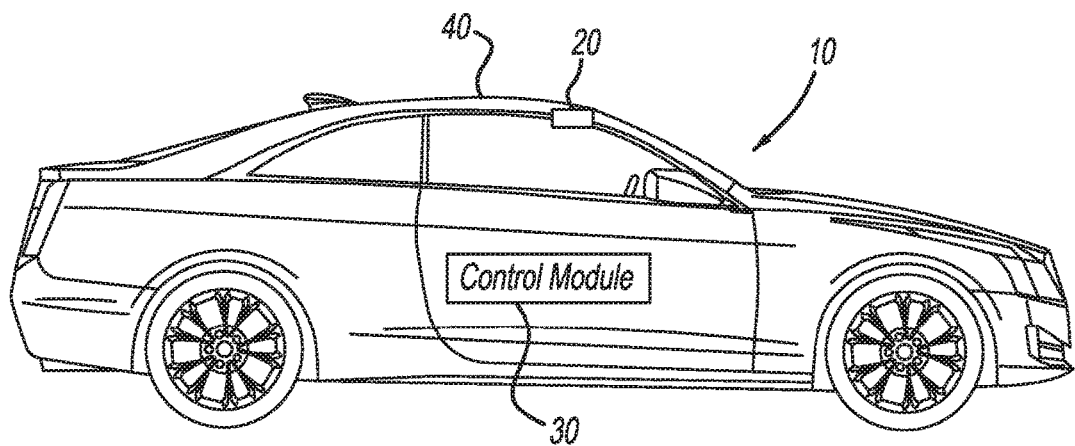
FIG. 1 illustrates a camera system according to the present teachings included with an exemplary vehicle.

With initial reference to FIG. 1, a camera system in accordance with the present teachings is illustrated at reference numeral 10. The camera system 10 generally includes a camera 20 and a control module 30. Although the camera system 10 is illustrated as included with a passenger vehicle 40, the system 10 can be included with any suitable type of vehicle. For example, the camera system 10 can be included with any suitable recreational vehicle, mass transit vehicle, construction vehicle, military vehicle, motorcycle, construction equipment, mining equipment, watercraft, aircraft, etc. Further, the camera system 10 can be used with any suitable non-vehicular applications to enhance the ability of the camera 20 to detect objects of interest.

The camera 20 can be any suitable camera or other sensor capable of detecting objects of interest. For example, the camera 20 can be any suitable visual light, extended spectrum, multi-spectral imaging, or fused imaging system camera and/or sensor. The camera 20 can be mounted at any suitable position about the vehicle 40, such as on a roof of the vehicle 40, at a front of the vehicle 40, on a windshield of the vehicle 40, etc. The camera system 10 can include any suitable number of cameras 20, although the exemplary system described herein includes a single camera 20.

As explained further herein, the control module 30 receives an image taken by the camera 20 including an object of interest, and adjusts the settings of the camera 20, such as gain, exposure, and shutter speed to the settings that are optimal based on the current environmental conditions for detecting the particular object of interest. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the control module 30 described herein.

The present teachings advantageously adjust the settings of the camera 20, such as gain, exposure, and shutter speed to the settings that are optimal based on the current environmental conditions for detecting particular objects. As described herein, the camera system 10 can be configured to adjust the settings of the camera 20 to optimal settings for identifying vehicle lane lines painted or printed on a road. However, the system 10 can be configured to set the settings of the camera 20 for optimal detection of any other suitable object as well, such as road signage, other vehicles, pedestrians, infrastructure, etc.

Figure 2:
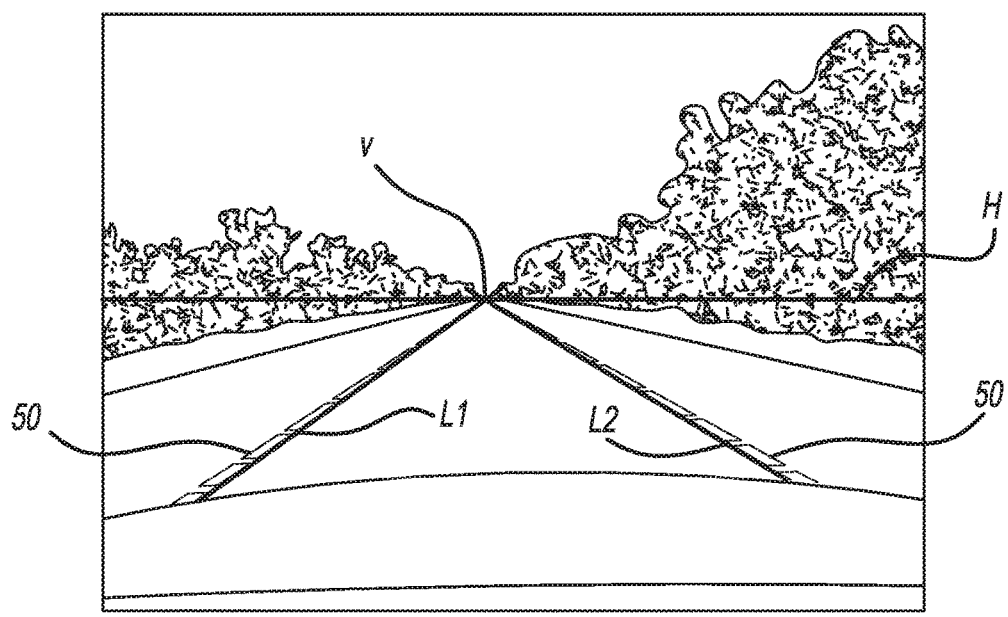
FIG. 2 illustrates an image area of an exemplary camera of the camera system according to the present teachings.

Any suitable portion of an image captured by the camera 20 can be used to identify the optimal camera settings based on current environmental conditions. For example and as illustrated in FIG. 2, the control module 30 can be configured to adjust the camera settings based on environmental conditions above a horizon line. To detect the horizon line, the control module 30 first identifies in an image captured by the camera 20 a vanishing point V where lines L1 and L2, which are drawn along left and right lane markers of a lane that the vehicle 40 is traveling in, appear to meet and/or cross in the distance. Line H is arranged by the control module 30 to extend through the vanishing point V in a direction perpendicular to a direction that the vehicle 40 is traveling in, and generally parallel to a surface of the road. Image data from the area above line H has been determined to be the most relevant to setting the camera 20, and thus it is data from above line H of each image captured by the camera 20, and the training images described herein, which is used to set the camera 20.

With continued reference to FIGS. 1 and 2, and additional reference to FIG. 3, a method according to the present teachings for creating a training model for optimally setting the camera 20 is illustrated at reference numeral 110 and will now be described in detail. The method 110 can be performed by the control module 30, or with any other suitable control module or system. With initial reference to block 112 of FIG. 3, multiple training images are obtained for training the camera 20. The training images can be obtained in any suitable manner, such as from a developer, manufacturer, and/or provider of the camera system 10. Any suitable number of training images can be obtained and used. For example, 5,000 training images of different environmental conditions for each one of a plurality of different scenes typically encountered by the camera 20 can be obtained. For example, 5,000 training images for each of the following typical scenes can be obtained: normal scene; rainy scene; snowy scene; sunny scene; cloudy scene; tunnel-enter scene; and tunnel-exit scene.

At block 114, the camera settings for each one of the training images obtained is identified. For example, the gain, exposure, and shutter speed settings for each training image obtained is identified. At block 116, each training image is classified according to the scene captured therein. Any suitable classifications can be used. For example, the training images can be classified into one of the following scenes: normal, rainy, snowy, sunny, cloudy, tunnel-enter, and tunnel-exit.

At block 118, each one of the training images is prepared for the extraction of features therefrom that can be used to distinguish the different training images from one another. The different training images can be distinguished based on any relevant features, such as, but not limited to, one or more of the following:

TABLE A

| Mean RGB | The mean value of red, green, blue plane |
|---|---|
| Mean Red | The mean value of red plane |
| Mean Green | The mean value of green plane |
| Mean Blue | The mean value of blue plane |
| Standard Deviation RGB | The standard deviation value of red, green, blue plane |
| Standard Deviation Red | The standard deviation value of red plane |
| Standard Deviation Green | The standard deviation value of green plane |
| Standard Deviation Blue | The standard deviation value of blue plane |
| Mean HSV | The RGB image converted to HSV, the mean value of the hue, saturation, value plane |
| Mean Hue | The RGB image converted to HSV, the mean value of the hue plane |
| Mean Saturation | The RGB image converted to HSV, the mean value of the saturation plane |
| Mean Value | The RGB image converted to HSV, the mean value of the value plane |
| Standard Deviation HSV | The RGB image converted to HSV, the standard deviation value of the hue, saturation, value plane |
| Standard Deviation Hue | The RGB image converted to HSV, the standard deviation value of the hue plane |
| Standard Deviation Saturation | The RGB image converted to HSV, the standard deviation value of the saturation plane |
| Standard Deviation Value | The RGB image converted to HSV, the standard deviation value of the value plane |
| Mean Gaussian Blurs (10) | The input converted to grayscale then a Gaussian blur run (ten different times with different values of sigma) then the mean value taken |
| Standard Deviation Gaussian Blurs (10) | The input converted to grayscale then a Gaussian blur run (ten different times with different values of sigma) then the standard deviation value taken |
| Mean Difference of Gaussian (10) | The input converted to grayscale then two Gaussian blurs run, followed by an image subtraction (difference of Gaussian) then the mean value taken |
| Standard Deviation Gaussian Blurs (10) | The input converted to grayscale then two Gaussian blurs run, followed by an image subtraction (difference of Gaussian) then the standard deviation value taken |

Each one of the training images can be prepared for extraction of features therefrom at block 118 in any suitable manner. For example and with reference to block 120, each color (red, green, blue) training image can be transformed to an HSV (hue, saturation, and value) image, from which various features listed above in Table A can be extracted. At block 122, color (red, green, blue) training images are converted to grayscale images, and at block 124 a Gaussian blur of each grayscale image is performed. Multiple Gaussian blurs of each grayscale image can be performed, and the difference of the multiple Gaussian blurs is taken at block 126.

With reference to block 130, after each one of the training images has been prepared, such as set forth at blocks 120, 122, 124, and 126, features relevant to distinguishing each training image from one another are extracted at bock 130. The features extracted at block 130 can be those set forth above at Table A, or any other suitable features. With reference to block 132, the extracted features are used to build a model, data set, or file of images. The model can be trained in any suitable manner, such as with any suitable algorithm. One example of a suitable algorithm that may be used is a random forest algorithm, but any other suitable algorithm can be used as well.

Figure 4:
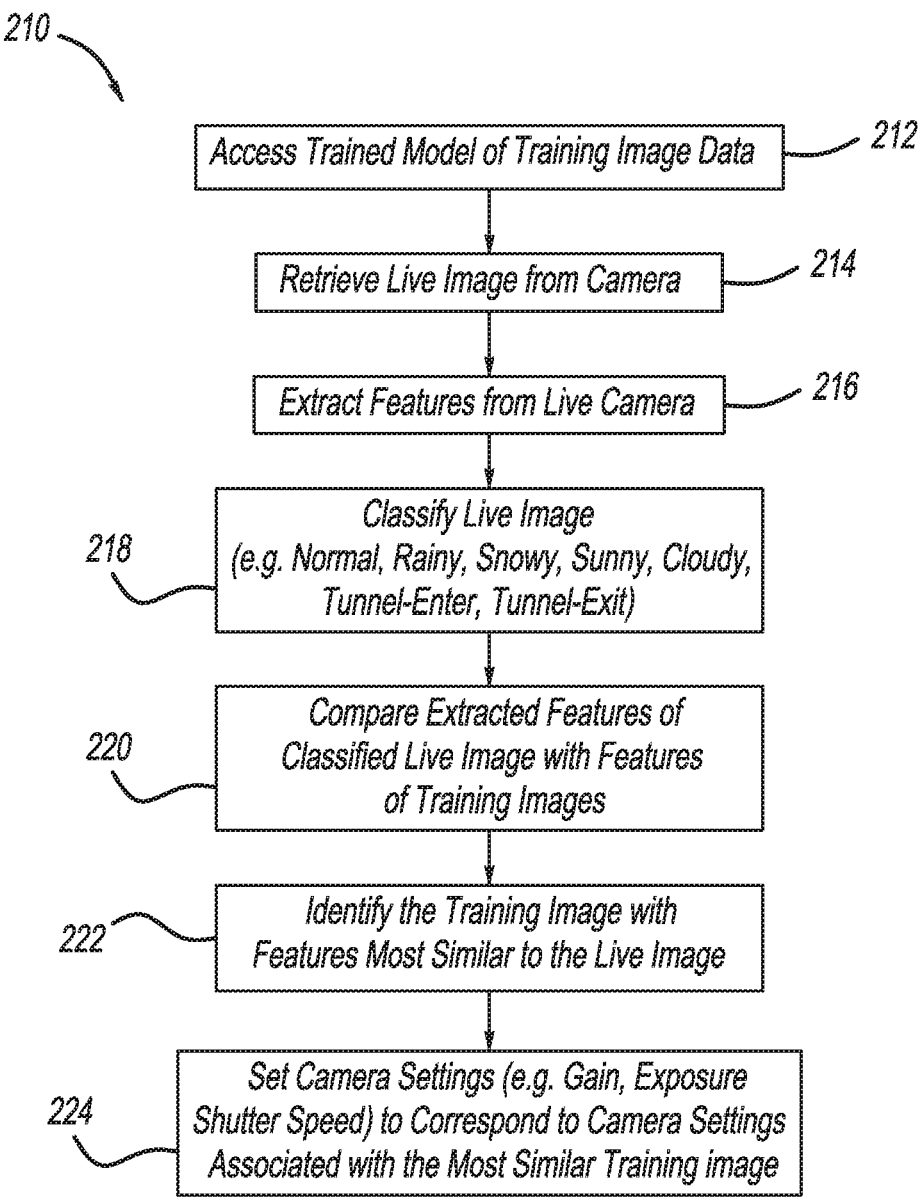
FIG. 4 illustrates a method according to the present teachings for configuring settings of the camera in an optimal manner to improve object detection.

With additional reference to FIG. 4, a method 210 according to the present teachings for setting the camera 20 will now be described. The method 210 can be performed by the control module 30 of the system 10, or in any other suitable manner, such as with any other suitable control module. With initial reference to block 212, the trained model of training image data obtained by performing the method 110, or in any other suitable manner, is accessed by the control module 30. The control module 30 can access the trained model of training image data in any suitable manner, such as by accessing data previously loaded to the control module 30, or accessing the trained model of training image data from a remote source, such as by way of any suitable remote connection (e.g., internet connection).

At block 214, the control module 30 retrieves a live image captured by the camera 20, such as of an area about the vehicle 40. At block 216, any suitable image features are extracted from the live image captured by the camera 20, such as the features listed above in Table A. To extract the features from the live image, the live image may be prepared in any suitable manner, such as set forth in FIG. 3 at blocks 120, 122, 124, and 126 with respect to the training images. At block 218, the live image is classified according to the scene captured therein. For example, the live image can be classified into any one of the following classifications: normal, rainy, snowy, sunny, cloudy, tunnel-enter, tunnel-exit.

Figure 3:
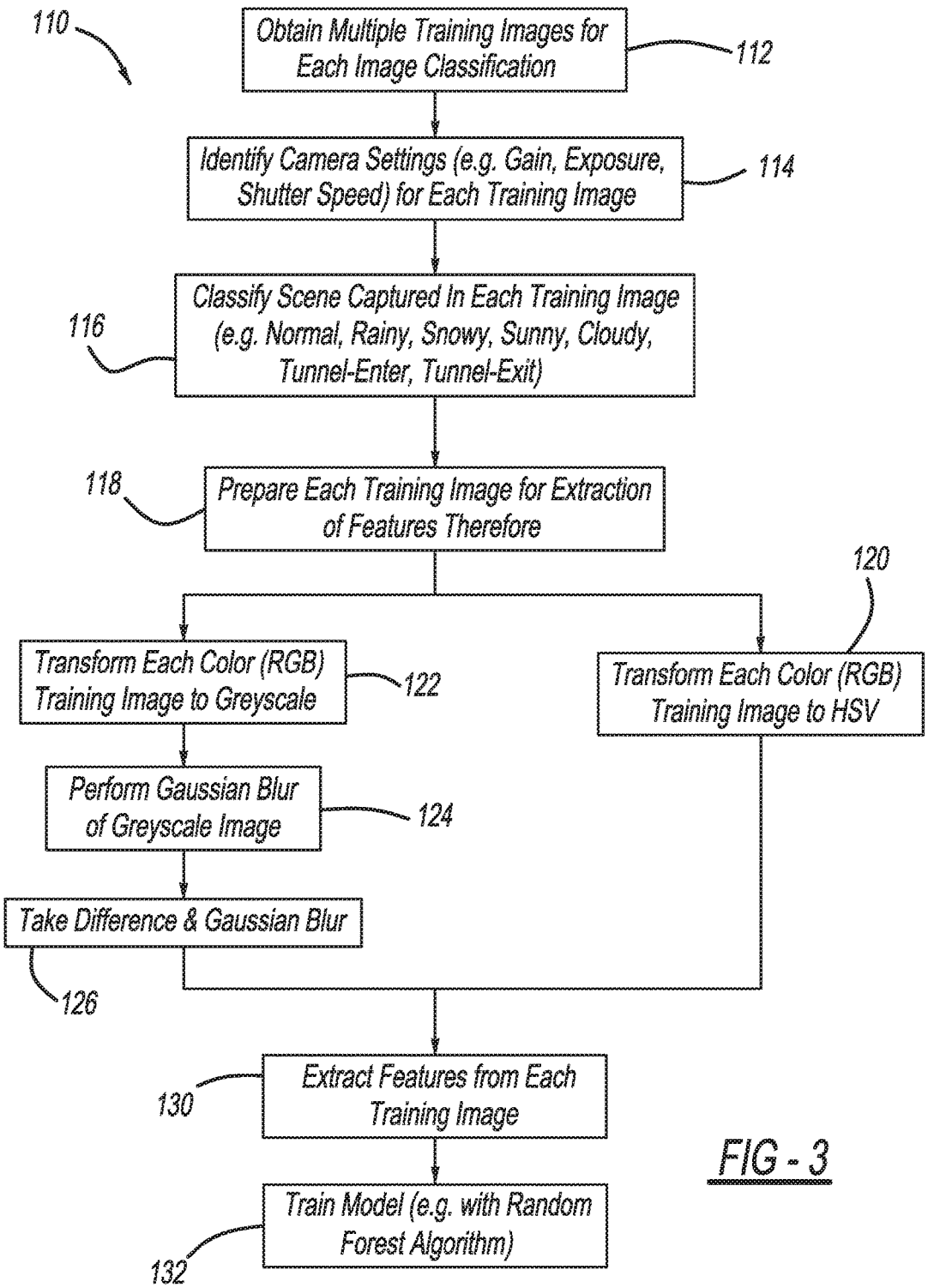
FIG. 3 illustrates a method according to the present teachings for creating a trained model for configuring a camera.

At block 220, the control module 30 compares the extracted features of the classified live image with the features extracted from each training image at block 130 of FIG. 3. At block 222, the control module 30 identifies the training image with features most similar to the live image captured by the camera 20. At block 224, the control module 30 configures the settings of the camera 20 to correspond with the camera settings used to capture the training image identified as being most similar to the live image captured by the camera 20. The control module 30 can configure any suitable settings of the camera 20, such as the gain, exposure, shutter speed, etc. of the camera 20.

The present teachings thus advantageously provide for methods and systems for running a computer vision algorithm automatically and dynamically to change camera settings in order to match the camera settings used to capture a reference image, the reference image previously having been found to be of a quality that facilitates identification of road lane lines, or any other suitable object of interest.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for setting a camera of a camera system for a vehicle, the method comprising:
   capturing an image of an area about the vehicle, and extracting image features from the captured image;
   identifying a horizon line in the image;
   comparing environmental conditions above the horizon line of the captured image to a plurality training images that were previously captured;
   determining which one of the plurality of training images is most similar to the environmental conditions above the horizon line in the captured image, including comparing the extracted image features extracted from the captured image with image features of the plurality of training images; and
   modifying settings of the camera to match camera settings used to capture the one or more of the plurality of training images that is most similar to the captured image above the identified horizon line;
   wherein the extracted image features include mean Gaussian blur obtained by converting the image to grayscale and running a Gaussian blur on the grayscale image multiple times with different values of sigma and taking the mean thereof, wherein sigma is a standard deviation.

2. The method of claim 1, further comprising capturing the image such that the image includes vehicle lanes of a roadway.

3. The method of claim 1, further comprising classifying the captured image as including one of the following scenes: normal; rainy; snowy; sunny; cloudy; tunnel-enter; and tunnel-exit.

4. The method of claim 3, wherein determining which one of the plurality of training images is most similar to the captured image includes comparing the scene of the captured image with scenes of the plurality of training images.

5. The method of claim 1, wherein the extracted image features further include one or more of the following: mean RGB; mean red; mean green; mean blue; standard deviation RGB; standard deviation red, standard deviation green; standard deviation blue; mean HSV; mean hue; mean saturation; mean value; standard deviation HSV; standard deviation hue; standard deviation saturation; standard deviation value; standard deviation Gaussian blur; and mean difference of Gaussian.

6. The method of claim 1, wherein modifying settings of the camera includes modifying at least one of gain, exposure, and shutter speed of the camera.

7. The method of claim 1, wherein the plurality of training images are included with a model trained with a random forest algorithm.

8. The method of claim 1, wherein at least one of the plurality of training images is prepared for extraction of features therefrom by transforming a color version of the at least one of the plurality of training images to a grayscale image, performing multiple Gaussian blurs on the at least one of the plurality of training images, and taking a difference of the Gaussian blurs.

9. The method of claim 1, wherein at least one of the plurality of training images is prepared for extraction of features therefrom by transforming a color version of the at least one of the plurality of images to an HSV (hue, saturation, and value) image.

10. A camera system for a vehicle, the system comprising:
a camera configured to capture an image of an area about the vehicle; and
a control module that:
extracts image features from the captured image;
identifies a horizon line in the image;
compares environmental conditions above the horizon line of the captured image to a plurality of previously captured training images;
determines which one of the plurality of training images is most similar to the environmental conditions above the horizon line in the captured image, including comparing the extracted image features extracted from the captured image with image features of the plurality of training images; and
modifies settings of the camera to match camera settings used to capture the one or more of the plurality of training images that is most similar to the captured image above the identified horizon line;
wherein the image features extracted by the control module include standard deviation Gaussian blur obtained by converting the image to grayscale and running a Gaussian blur on the grayscale image multiple times with different standard deviation values and taking the standard deviation thereof.

11. The camera system of claim 10, wherein the camera is configured to capture vehicle lanes of a roadway in the captured image.

12. The camera system of claim 10, wherein the control module further classifies the captured image as including one of the following scenes: normal; rainy; snowy; sunny; cloudy; tunnel-enter; and tunnel-exit.

13. The camera system of claim 12, wherein the control module compares the scene of the captured image with scenes of the plurality of training images when determining which one of the plurality of training images is most similar to the captured image.

14. The camera system of claim 10, wherein the image features extracted by the control module further include one or more of the following: mean RGB; mean red; mean green; mean blue; standard deviation RGB; standard deviation red, standard deviation green; standard deviation blue; mean HSV; mean hue; mean saturation; mean value; standard deviation HSV; standard deviation hue; standard deviation saturation; standard deviation value; mean Gaussian blur; and mean difference of Gaussian.

15. The camera system of claim 10, wherein the control module modifies settings of the camera including at least one of gain, exposure, and shutter speed.

16. The camera system of claim 10, wherein control module includes the plurality of training images as a model trained with a random forest algorithm.

17. A camera system for a vehicle, the system comprising:
a camera configured to capture an image of an area about the vehicle; and
a control module that:
extracts image features from the captured image;
identifies a horizon line in the image;
compares environmental conditions above the horizon line of the captured image to a plurality of previously captured training images;
determines which one of the plurality of training images is most similar to the environmental conditions above the horizon line in the captured image, including comparing the extracted image features extracted from the captured image with image features of the plurality of training images; and
modifies settings of the camera to match camera settings used to capture the one or more of the plurality of training images that is most similar to the captured image above the identified horizon line;
wherein the image features extracted by the control module include mean Gaussian blur obtained by converting the image to grayscale and running a Gaussian blur on the grayscale image multiple times with different values of sigma and taking the mean thereof, wherein sigma is a standard deviation.

* * * * *